United States Patent
Raja Sekaran et al.

(10) Patent No.: US 10,742,445 B2
(45) Date of Patent: Aug. 11, 2020

(54) SYSTEM FOR DETECTING LOOPS IN A PSEUDO-BRIDGE

(71) Applicant: Silicon Laboratories Inc., Austin, TX (US)

(72) Inventors: Vasanth Ragavendran Raja Sekaran, Singapore (SG); Kumara Sundaram Shanmugarajan, Singapore (SG)

(73) Assignee: Silicon Laboratories, Inc., Austin, TX (US)

( * ) Notice: Subject to any disclaimer, the term of this patent is extended or adjusted under 35 U.S.C. 154(b) by 14 days.

(21) Appl. No.: 16/045,196

(22) Filed: Jul. 25, 2018

(65) Prior Publication Data
US 2020/0036551 A1    Jan. 30, 2020

(51) Int. Cl.
*H04L 29/12* (2006.01)
*H04L 12/46* (2006.01)
*H04L 12/701* (2013.01)

(52) U.S. Cl.
CPC ........... *H04L 12/462* (2013.01); *H04L 45/00* (2013.01)

(58) Field of Classification Search
CPC .................................................. H04L 12/462
See application file for complete search history.

(56) References Cited

U.S. PATENT DOCUMENTS

| | | | |
|---|---|---|---|
| 2009/0028180 A1* | 1/2009 | Stater ................. | H04L 12/2838 370/465 |
| 2016/0192403 A1* | 6/2016 | Gupta .................... | H04L 12/18 455/411 |
| 2018/0191603 A1* | 7/2018 | Krattiger ............. | H04L 41/0803 |

OTHER PUBLICATIONS

"Bridging Network Connections with Proxy ARP", accessed Aug. 5, 2015, https://wiki.debian.org/BridgeNetworkConnectionsProxyArp?action=print.

* cited by examiner

*Primary Examiner* — John D Blanton
(74) *Attorney, Agent, or Firm* — Nields, Lemack & Frame, LLC (57) ABSTRACT

A system and method for determining whether a gateway device, having two different network interfaces, is able to successfully operate as a Pseudo-Bridge. The gateway device transmits a message to a known network service entity on each of its network interfaces. For example, the gateway device may transmit a DHCP request on both its network interfaces. Alternatively, the gateway device transmits a message to an application server. If the network service entity on each network responds with the same IP address, a network loop is assumed to exist. In this case, the gateway may operate as a traditional router. If the network service entities on the two networks respond with different IP addresses, the gateway device operates as a Pseudo-Bridge. In this way, the network operates correctly in all scenarios.

14 Claims, 5 Drawing Sheets

SYSTEM FOR DETECTING LOOPS IN A PSEUDO-BRIDGE

FIELD

This disclosure describes systems and methods for detecting and resolving network loops in a pseudo-bridge.

BACKGROUND

Pseudo-Bridges allow nodes on a first network to believe that nodes on a second, different network are actually disposed on the first network. Briefly, a device, such as a gateway, may have network interfaces on two different networks, which may be referred to as a first network and a second network.

Internet Standard STD 37 defines an address resolution protocol (ARP). The ARP protocol allows a device to learn the link layer address, in other words, the Media Access Control (MAC) address, of a second device based on the second device's Internet Protocol (IP) address. Typically, the device transmits a broadcast message, known as an ARP message, containing the IP address and requesting the MAC address associated with that IP address. Once a response is returned to the device, that device uses that MAC address whenever communicating with the second device.

There exists a concept known as Proxy ARP, in which one device responds to the ARP message on behalf of another device. For example, a plurality of devices may be disposed behind a firewall. In this case, the firewall would respond to any ARP requests for the devices disposed behind it, responding with its own MAC address.

Proxy ARP can also be used to bridge two networks such that the devices present on a first network appear to devices on the second network as being part of that second network. A gateway that connects two networks and utilizes this concept may be referred to as Pseudo-Bridge.

Pseudo-Bridges maintain a first list of devices that are in communication with its first network and a second list of devices that are in communication with its second network. In certain embodiments, the first and second networks may be different, such as one is an Ethernet network and the second is a Wi-Fi network. In other words, in certain embodiments, a Pseudo-Bridge is an OSI Layer 3 solution that allows wired and wireless networks to appear as a single network.

When a device on the first network transmits an ARP request to a second device, the Pseudo-Bridge determines if that second device is on the second network by checking the second list. If it is, the Pseudo-Bridge responds to the ARP request by transmitting the MAC address of the network controller disposed on the first network. If the second device is not located on the second network, the Pseudo-Bridge does not respond to the ARP request.

This approach is successful as long as the Pseudo-Bridge is able to successfully construct the first and second lists. However, certain situations may cause those lists to be inaccurate or incorrect. Traditional techniques for detecting loops, such as Spanning Tree protocol (STP), are not useful, as these are Layer 2 solutions. Therefore, it would be beneficial if there were a system and method for correctly configuring the Pseudo-Bridge in these instances.

SUMMARY

A system and method for determining whether a gateway device, having two different network interfaces, is able to successfully operate as a Pseudo-Bridge. The gateway device transmits a message to a known network service entity on each of its network interfaces. For example, the gateway device may transmit a DHCP request on both its network interfaces. Alternatively, the gateway device transmits a message to an application server. If the network service entity on each network responds with the same IP address, a network loop is assumed to exist. In this case, the gateway may operate as a traditional router. If the network service entities on the two networks respond with different IP addresses, the gateway device operates as a Pseudo-Bridge. In this way, the network operates correctly in all scenarios.

According to a first embodiment, a gateway device is disclosed. The gateway device comprises a first network interface to communicate with a first network; a second network interface to communicate with a second network; a processing unit; a memory device in communication with the processing unit, the memory device comprises instructions, which when executed by the processing unit, enable the gateway device to: determine whether a network loop exists; and operate in a first mode or a second mode, based on the determination. In some embodiments, the first mode comprises operating as a Layer 3 router. In some embodiments, the second mode comprises operating as a Pseudo-Bridge. In certain embodiments, the gateway device is disabled in the first mode. In certain embodiments, the memory device further comprises instructions, which when executed by the processing unit, enable the gateway device to: determine a first IP address of a first network service entity on the first network; determine a second IP address of a second network service entity on the second network, where the first network service entity and the second network service entity perform the same function or service; and compare the first IP address and the second IP address to determine whether the network loop exists. In certain further embodiments, the first network service entity and the second network service entity comprise dynamic host configuration protocol (DHCP) servers. In another further embodiments, the memory device further comprises instructions, which when executed by the processing unit, enable the gateway device to: transmit a first DHCP request on the first network; receive a first DHCP response from the first network; parse a source IP address from the first DHCP response to determine the first IP address of the first network service entity on the first network; transmit a second DHCP request on the second network; receive a second DHCP response from the second network; and parse a source IP address from the second DHCP response to determine the second IP address of the second network service entity on the second network. In certain embodiments, the first network service entity and the second network service entity comprise devices selected from the group consisting of Remote Authentication Dial-In User Service (RADIUS) servers, authentication servers, Lightweight Directory Access Protocol (LDAP) servers, File Transfer Protocol (FTP) servers, Hypertext Transfer Protocol (HTTP) servers, Simple Network Management Protocol (SNMP) servers, Simple Mail Transfer Protocol (SMTP) servers, Bootstrap Protocol (BOOTP) servers, and Reverse Address Resolution Protocol (RARP) servers.

According to another embodiment, a method of operating a gateway device connecting a first network and a second network is disclosed. The method comprises determining, using the gateway device, whether a network loop exists between the first network and the second network; operating in a first mode if a network loop is determined to exist; and operating in a second mode if a network loop is determined not to exist. In some embodiments, the first mode comprises operating as a Layer 3 router. In some embodiments, the second mode comprises operating as a Pseudo-Bridge. In certain embodiments, the method further comprises determining a first IP address of a first network service entity on the first network; determining a second IP address of a second network service entity on the second network, where the first network service entity and the second network service entity perform the same function or service; and comparing the first IP address and the second IP address to determine whether the network loop exists. In certain embodiments, the first network service entity and the second network service entity comprise dynamic host configuration protocol (DHCP) servers and the method further comprises transmitting a first DHCP request on the first network; receiving a first DHCP response from the first network; parsing a source IP address from the first DHCP response to determine the first IP address of the first network service entity on the first network; transmitting a second DHCP request on the second network; receiving a second DHCP response from the second network; and parsing a source IP address from the second DHCP response to determine the second IP address of the second network service entity on the second network.

According to another embodiment, a gateway device is disclosed. The gateway device comprises a first network interface to communicate with a first network; a second network interface to communicate with a second network; a processing unit; a memory device in communication with the processing unit, the memory device comprises instructions, which when executed by the processing unit, enable the gateway device to: determine a first IP address of a first network service entity on the first network; determine a second IP address of a second network service entity on the second network, where the first network service entity and the second network service entity perform the same function or service; determine that a network loop does not exist if the first IP address is different from the second IP address; and operate as a Pseudo-Bridge if the network loop does not exist. In certain embodiments, the memory device further comprises instructions, which when executed by the processing unit, enable the gateway device to: operate as a Layer 3 router if the network loop does exist.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
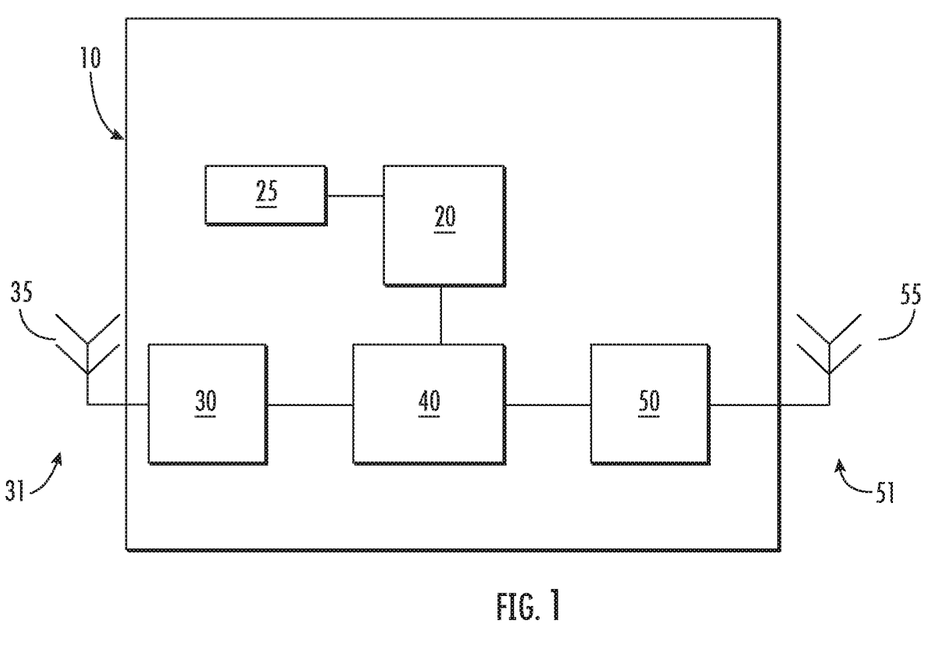
FIG. 1 is a block diagram of a representative gateway device.

FIG. 1 shows a block diagram of a representative network device, also referred to as a gateway device 10.

The gateway device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions, which, when executed by the processing unit 20, enable the gateway device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

The gateway device 10 also includes a first network interface 30, which may be a wireless interface including an antenna 35. The first network interface 30 may support any wireless network, such as Wi-Fi. In other embodiments, the first network interface 30 may support a wired network, such as Ethernet. The first network interface 30 is used to allow the gateway device to communicate with other devices disposed on the first network 31.

The gateway device 10 also includes a second network interface 50, which may be a wired interface. In other embodiments, the second network interface may be a wireless interface, including an antenna 55. The second network interface is used to allow the gateway device 10 to communicate with other devices disposed on the second network 51.

The gateway device 10 may include a second memory device 40 in which data that is received and transmitted by the first network interface 30 and the second network interface 50 is stored. This second memory device 40 is traditionally a volatile memory. The processing unit 20 has the ability to read and write the second memory device 40 so as to communicate with the other nodes in the first network 31 and the second network 51. Although not shown, the gateway device 10 also has a power supply, which may be a battery or a connection to a permanent power source, such as a wall outlet.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language and is not limited by this disclosure. Thus, in some embodiments, there may be multiple computer readable media that contain the instructions described herein. The first computer readable media may be in communication with the processing unit 20, as shown in FIG. 1. The second computer readable media may be a CDROM, or a different memory device, which is located remote from the gateway device 10. The instructions contained on this second computer readable media may be downloaded onto the memory device 25 to allow execution of the instructions by the gateway device 10.

While the processing unit 20, the memory device 25, the first network interface 30, the second memory device 40, and the second network interface 50 are shown in FIG. 1 as separate components, it is understood that some or all of these components may be integrated into a single electronic component. Rather, FIG. 1 is used to illustrate the functionality of the gateway device 10, not its physical configuration.

The gateway device 10 may be used to allow communicate between devices on the first network 31 and devices on the second network 51. In certain embodiments, the gateway device 10 may operate as a traditional Layer 3 router. In other embodiments, the gateway device 10 may operate as a Pseudo-Bridge. In yet other embodiments, the gateway device 10 may be disabled.

To determine which of these modes to operate in, the gateway device 10 may first determine whether there are any loops in the network. This is an important determination, as Pseudo-Bridges can only operate correctly if the gateway device correctly identifies the devices disposed on the first network 31 and the second network 51.

Figure 2:
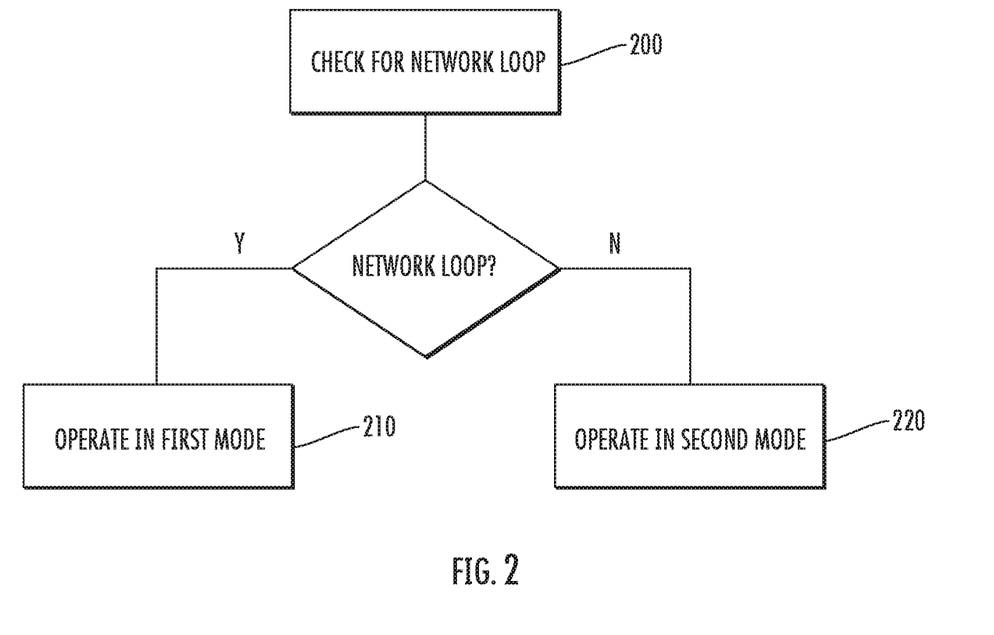
FIG. 2 shows a flowchart illustrating how the gateway device determines its mode of operation.

Thus, the memory device 25 contains instructions that allow the gateway device 10 to determine whether there are any network loops. As shown in FIG. 2, the gateway device 10 first determines whether any network loops exist, as shown in Process 200. If a network loop exists, the gateway device 10 operates in a first mode, as shown in Process 210. The first mode may be operating as a traditional Layer 3 router. Alternatively, the first mode may be to disable operation. If, on the other hand, the gateway device does not discover any network loops, the gateway device 10 operates in a second mode, as shown in Process 220. This second mode may be to operate as a Pseudo-Bridge.

Figure 5A:
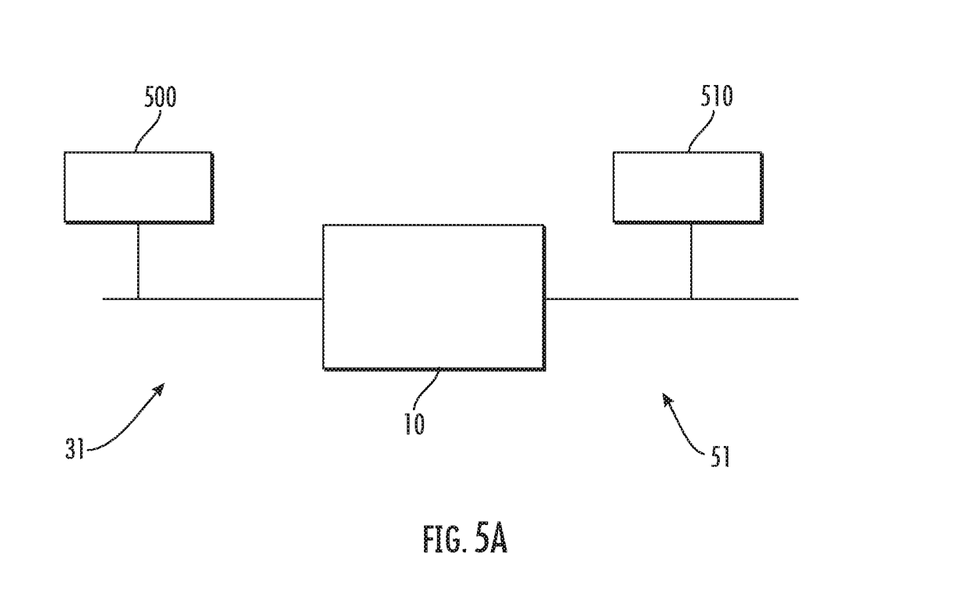
FIGS. 5A-5B show two different possible network configurations.
Figure 5B:
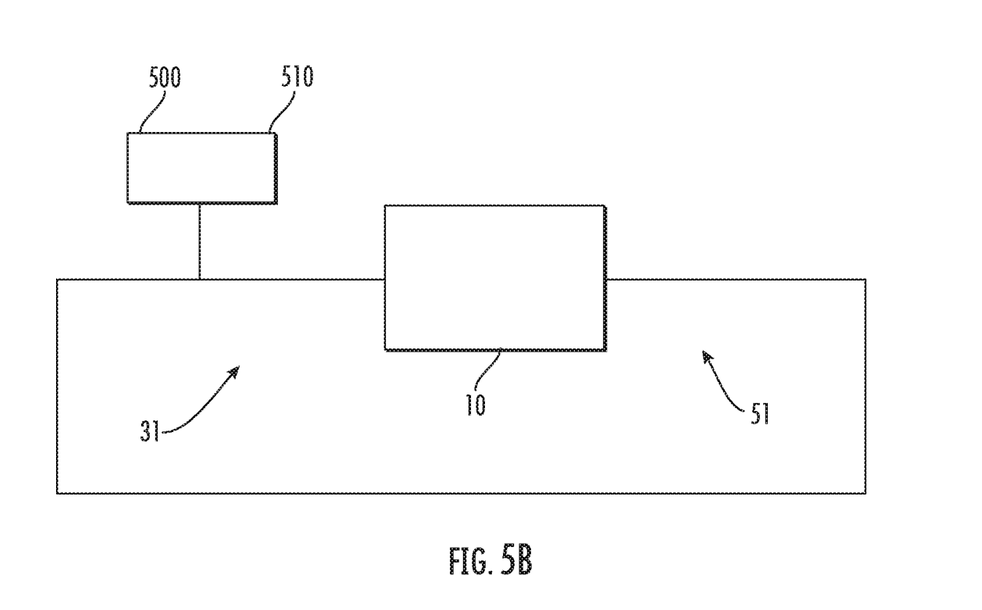

FIG. 5A-5B show two possible network configurations. While the networks appear as wired connections, it is understood that one or more of the networks may be a wireless network. The solid lines are shown to more clearly illustrate the presence of a network loop in FIG. 5B. FIG. 5A shows the gateway device 10 connected to a first network 31 and a second network 51, wherein there are no network loops. In this case, the first network service entity 500 is different from the second network service entity 510. FIG. 5B shows the gateway device 10 connected to a first network 31 and a second network 51, wherein there is a network loop. In this case, the first network service entity 500 is the same as the second network service entity 510. It is understood that other network devices may also be disposed on the first network 31 and the second network 51.

Figure 3:
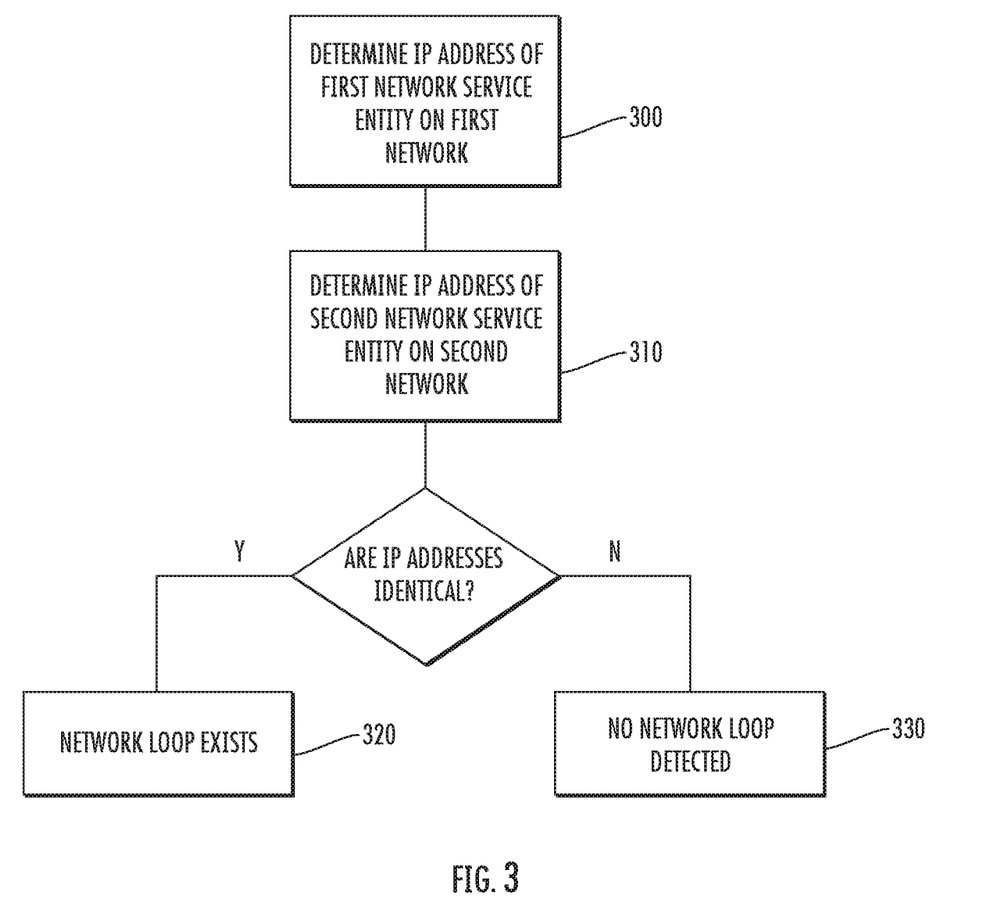
FIG. 3 illustrates a flowchart showing how the gateway determines whether a network loop exists.

FIG. 3 shows a flowchart indicating how the gateway device 10 determines whether a network loop is present. As noted above, FIGS. 5A-5B show actual network configurations that may exist. Thus, FIG. 3 shows a process that may be used by the gateway device 10 to determine whether the gateway device 10 is part of the network configuration shown in FIG. 5A or the configuration found in FIG. 5B. First, the gateway device 10 determines the IP address of a first network service entity 500 on the first network 31, as shown in Process 300. In this disclosure, "a network service entity" refers to any entity that is used to provide a network service, regardless of its OSI layer. Thus, network service entities may include dynamic host configuration protocol (DHCP) servers, Remote Authentication Dial—In User Service (RADIUS) servers, authentication servers, Lightweight Directory Access Protocol (LDAP) servers, File Transfer Protocol (FTP) servers, Hypertext Transfer Protocol (HTTP) servers, Simple Network Management Protocol (SNMP) servers, Simple Mail Transfer Protocol (SMTP) servers, Bootstrap Protocol (BOOTP) servers, Reverse Address Resolution Protocol (RARP) servers or others.

The gateway device 10 then determines the IP address of a second network service entity 510 on the second network 51, as shown in Process 310. The first network service entity 500 and the second network service entity 510 provide the same function or service. In other words, if the gateway device 10 determines the IP address of the DHCP server on the first network 31 in Process 300, it will determine the IP address of the DHCP server on the second network 51. Likewise, if the gateway device 10 determines the IP address of the LDAP server on the first network 31 in Process 300, it will determine the IP address of the LDAP server on the second network 51 in Process 310. The gateway device 10 then compares these two IP addresses. If the IP addresses are the same, the gateway device 10 determines that a network loop exists, as shown in Process 320. In other words, the first network service entity 500 and the second network service entity 510 are the same device, as shown in FIG. 5B. If the IP addresses are not the same, the gateway device 10 determines that no network loop exists, as shown in Process 330. This is the configuration shown in FIG. 5A. Thus, the flowchart of FIG. 3 may be used to perform the function recited in Process 200 of FIG. 2.

Figure 4:
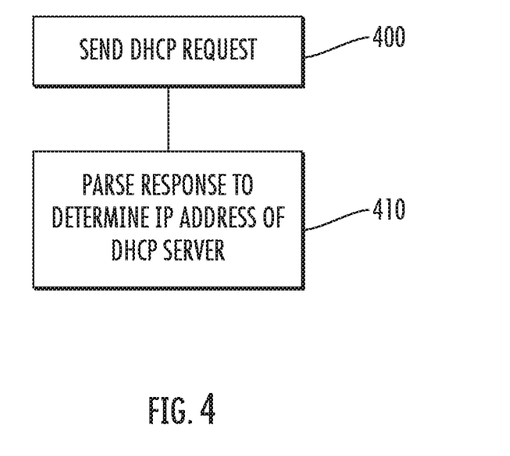
FIG. 4 illustrates a flowchart showing how the gateway device determines the IP address of a network entity.

FIG. 4 shows one procedure that may be used to find the IP of a network service entity. In this example, the network service entity is a DHCP server. The DHCP server was selected as almost all networks include a DHCP server. To determine the IP address of the DHCP server, the gateway device 10 transmits a DHCP request, as shown in Process 400. The DHCP server receives the DHCP request and answers with a DHCP response. Contained within the DHCP response is the source address, which is the IP address of the DHCP server. The gateway device 10 parses the DHCP response to extract the IP address of the DHCP server, as shown in Process 410. Thus, the flowchart of FIG. 4 may be used to determine the IP address of a network service entity, as required in Processes 300 and 310 in FIG. 3.

In summary, the gateway device 10 is capable of operating in at least two different modes. The first mode is either disabled or as a Layer 3 router. The second mode is as a Pseudo-Bridge. The selection of which mode is made upon the determination of whether a network loop exists. In certain embodiments, the gateway device 10 obtains the IP address of a particular network service entity on both the first network 31 and the second network 51. Further, if some embodiments, the gateway device 10 transmits a message to a first network service entity on its first network and determines the IP address associated with that first network service entity. It then transmits a message to a second network service entity on its second network which performs the same function as the first network service entity. It then determines the IP address associated with the second network service entity. A comparison of these two IP addresses is used to determine whether a network loop exists.

When operating as a Pseudo-Bridge, the gateway device 10 obtains the IP address of every device in communication with the first network interface 30. It also obtains the IP address of every device in communication with the second network interface 50. If a first device located on the first network 31 sends an ARP request for an IP address associated with a second device that is disposed on the second network 51, the gateway device 10 answers that ARP request. The gateway device 10 returns the requested IP address, along with the MAC address of the first network interface 30. Any future communications from the first device to the second device are received first by the gateway device 10, which then retransmits the message to the second device. In this way, the first device and the second device believe that they exist on the same network.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A gateway device, comprising:
   a first network interface to communicate with a first network;
   a second network interface to communicate with a second network;
   a processing unit;
   a memory device in communication with the processing unit, the memory device comprises instructions, which when executed by the processing unit, enable the gateway device to:
   determine whether a network loop exists; and
   operate in a first mode or a second mode, based on the determination;
   wherein, in the first mode, the gateway device operates as a Layer 3 router; and in the second mode, the gateway device operates as a Pseudo-Bridge.

2. The gateway device of claim 1, wherein the memory device further comprises instructions, which when executed by the processing unit, enable the gateway device to:
   determine a first IP address of a first network service entity on the first network;
   determine a second IP address of a second network service entity on the second network, where the first network service entity and the second network service entity perform the same function or service; and
   compare the first IP address and the second IP address to determine whether the network loop exists.

3. The gateway device of claim 2, wherein the first network service entity and the second network service entity comprise dynamic host configuration protocol (DHCP) servers.

4. The gateway device of claim 3, wherein the memory device further comprises instructions, which when executed by the processing unit, enable the gateway device to:
   transmit a first DHCP request on the first network;
   receive a first DHCP response from the first network;
   parse a source IP address from the first DHCP response to determine the first IP address of the first network service entity on the first network;
   transmit a second DHCP request on the second network;
   receive a second DHCP response from the second network; and
   parse a source IP address from the second DHCP response to determine the second IP address of the second network service entity on the second network.

5. The gateway device of claim 2, wherein the first network service entity and the second network service entity comprise devices selected from the group consisting of Remote Authentication Dial-In User Service (RADIUS) servers, authentication servers, Lightweight Directory Access Protocol (LDAP) servers, File Transfer Protocol (FTP) servers, Hypertext Transfer Protocol (HTTP) servers, Simple Network Management Protocol (SNMP) servers, Simple Mail Transfer Protocol (SMTP) servers, Bootstrap Protocol (BOOTP) servers, and Reverse Address Resolution Protocol (RARP) servers.

6. A method of operating a gateway device connecting a first network and a second network, comprising:
   determining, using the gateway device, whether a network loop exists between the first network and the second network;
   operating in a first mode if a network loop is determined to exist; and
   operating in a second mode if a network loop is determined not to exist;
   wherein the first mode comprises operating as a Layer 3 router.

7. The method of claim 6, wherein the second mode comprises operating as a Pseudo-Bridge.

8. The method of claim 6, further comprising:
   determining a first IP address of a first network service entity on the first network;
   determining a second IP address of a second network service entity on the second network, where the first network service entity and the second network service entity perform the same function or service; and
   comparing the first IP address and the second IP address to determine whether the network loop exists.

9. The method of claim 8, wherein the first network service entity and the second network service entity comprise dynamic host configuration protocol (DHCP) servers.

10. The method of claim 9, comprising:
    transmitting a first DHCP request on the first network;
    receiving a first DHCP response from the first network;
    parsing a source IP address from the first DHCP response to determine the first IP address of the first network service entity on the first network;
    transmitting a second DHCP request on the second network;
    receiving a second DHCP response from the second network; and
    parsing a source IP address from the second DHCP response to determine the second IP address of the second network service entity on the second network.

11. The method of claim 8, wherein the first network service entity and the second network service entity comprise devices selected from the group consisting of Remote Authentication Dial-In User Service (RADIUS) servers, authentication servers, Lightweight Directory Access Protocol (LDAP) servers, File Transfer Protocol (FTP) servers, Hypertext Transfer Protocol (HTTP) servers, Simple Network Management Protocol (SNMP) servers, Simple Mail Transfer Protocol (SMTP) servers, Bootstrap Protocol (BOOTP) servers, and Reverse Address Resolution Protocol (RARP) servers.

12. A gateway device, comprising:
    a first network interface to communicate with a first network;
    a second network interface to communicate with a second network;
    a processing unit;
    a memory device in communication with the processing unit, the memory device comprises instructions, which when executed by the processing unit, enable the gateway device to:
    determine a first IP address of a first network service entity on the first network;
    determine a second IP address of a second network service entity on the second network, where the first network service entity and the second network service entity perform the same function or service;

determine that a network loop does not exist if the first IP address is different from the second IP address; and operate as a Pseudo-Bridge if the network loop does not exist.

13. The gateway device of claim 12, wherein the memory device further comprises instructions, which when executed by the processing unit, enable the gateway device to:

operate as a Layer 3 router if the network loop does exist.

14. The gateway device of claim 12, wherein the first network service entity and the second network service entity comprise devices selected from the group consisting of dynamic host configuration protocol (DHCP) servers, Remote Authentication Dial-In User Service (RADIUS) servers, authentication servers, Lightweight Directory Access Protocol (LDAP) servers, File Transfer Protocol (FTP) servers, Hypertext Transfer Protocol (HTTP) servers, Simple Network Management Protocol (SNMP) servers, Simple Mail Transfer Protocol (SMTP) servers, Bootstrap Protocol (BOOTP) servers, and Reverse Address Resolution Protocol (RARP) servers.

\* \* \* \* \*